United States Patent [19]

Hulsing, II

[11] Patent Number: 5,417,120

[45] Date of Patent: *May 23, 1995

[54] VIBRATING BEAM FORCE TRANSDUCER WITH AUTOMATIC DRIVE CONTROL

[75] Inventor: Rand H. Hulsing, II, Redmond, Wash.

[73] Assignee: Allied-Signal Inc., Morris Township, Morris County, N.J.

[*] Notice: The portion of the term of this patent subsequent to Aug. 23, 2011 has been disclaimed.

[21] Appl. No.: 72,811

[22] Filed: Jun. 7, 1993

[51] Int. Cl.$^6$ ............................................. G01L 1/00
[52] U.S. Cl. .............................. 73/862.59; 73/862.41
[58] Field of Search ............. 73/517 AU, 704, 862.41, 73/862.59, DIG. 1

[56] References Cited

U.S. PATENT DOCUMENTS

| | | |
|---|---|---|
| 4,155,257 | 5/1979 | Wittke ............................ 73/DIG. 1 |
| 4,372,173 | 2/1983 | EerNisse . |
| 4,912,990 | 4/1990 | Norling . |
| 5,142,913 | 9/1992 | Delatorre ......................... 73/862.44 |

Primary Examiner—Richard E. Chilcot, Jr.
Assistant Examiner—R. Biegel
Attorney, Agent, or Firm—Howard G. Massung

[57] ABSTRACT

A vibrating beam force transducer is comprised of an oscillating sensing element having an output frequency indicative of the force applied to the sensing element. The sensing element has a variable electrical resistance which can vary in accordance with temperature fluctuations over the operating range of the transducer.

A drive circuit utilizes an AC drive signal source that is electrically coupled to the sensing element to drive the sensing element at its resonant frequency which is a function of the force applied to the sensing element. The drive circuit has a DC compensation circuit that alters the electrical characteristics of the drive circuit in response to variations in the electrical resistance of the sensing element.

16 Claims, 3 Drawing Sheets

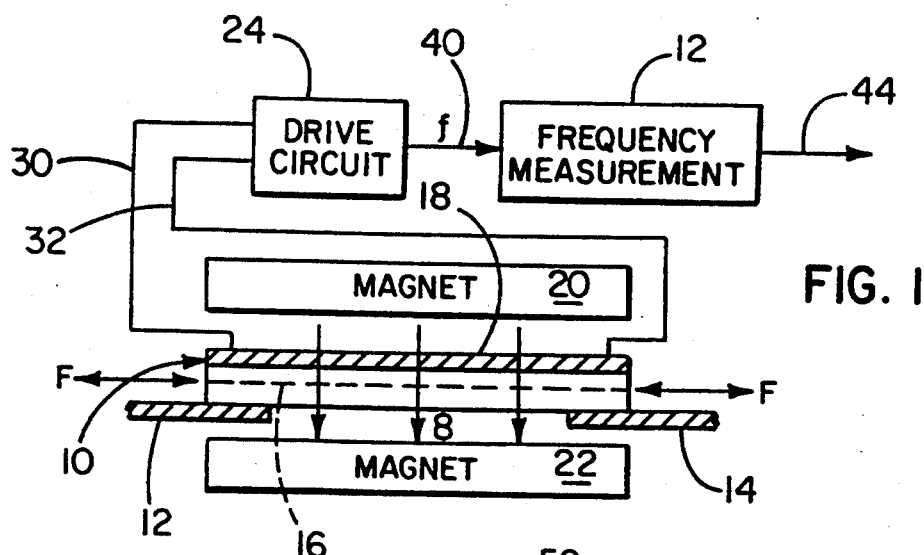
FIG. 1
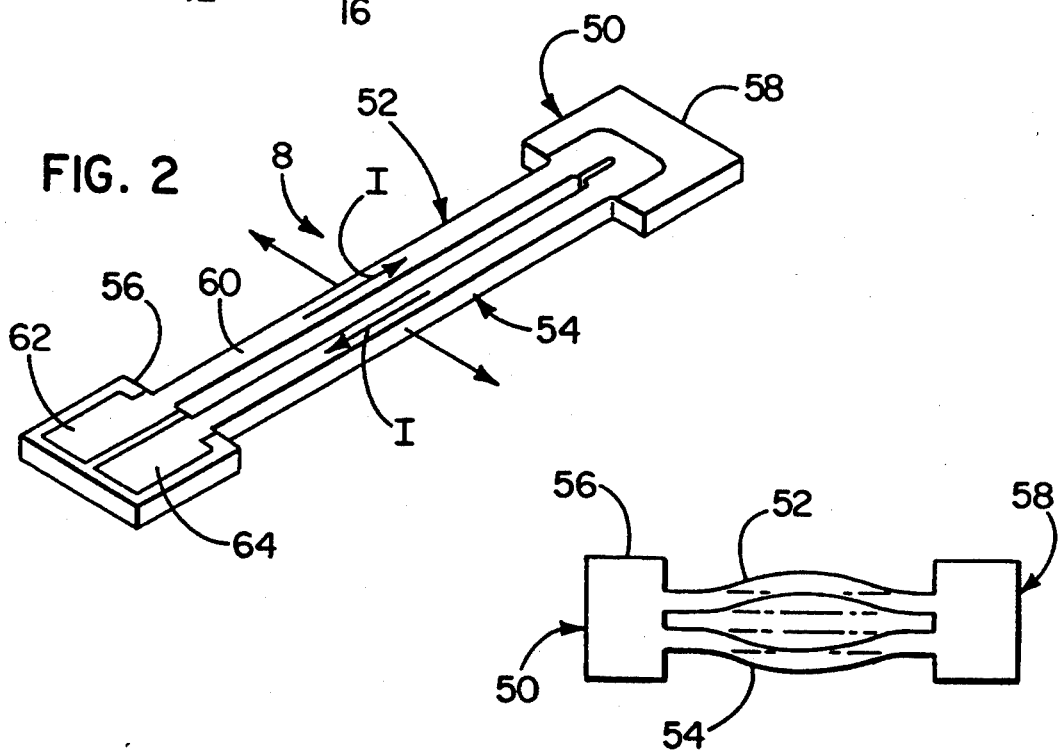
FIG. 2
FIG. 3
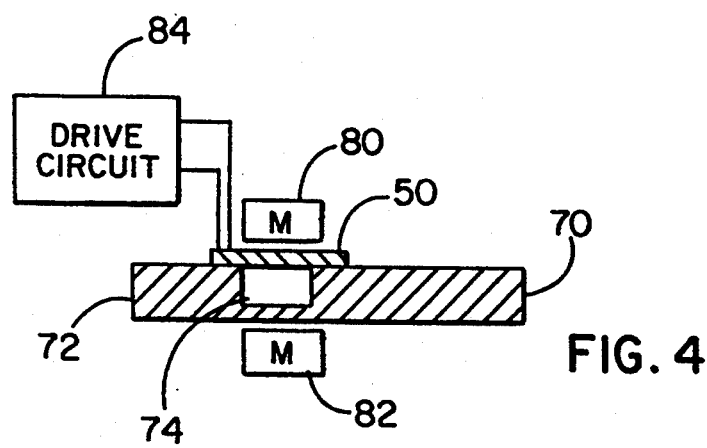
FIG. 4

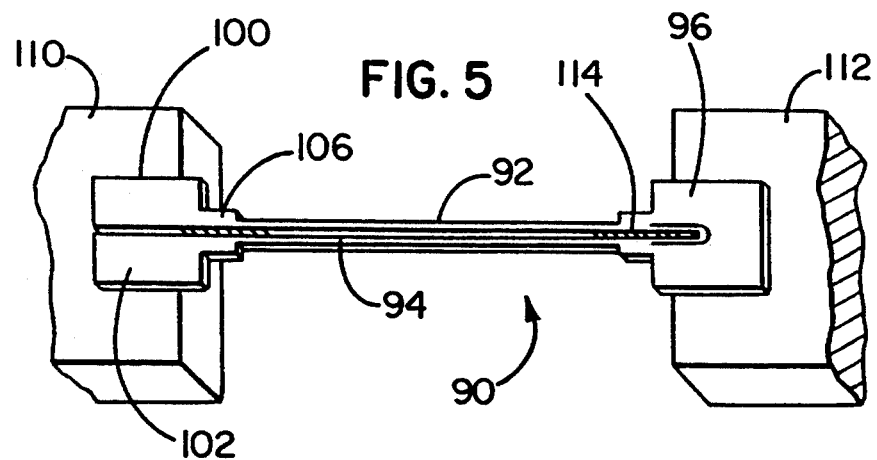
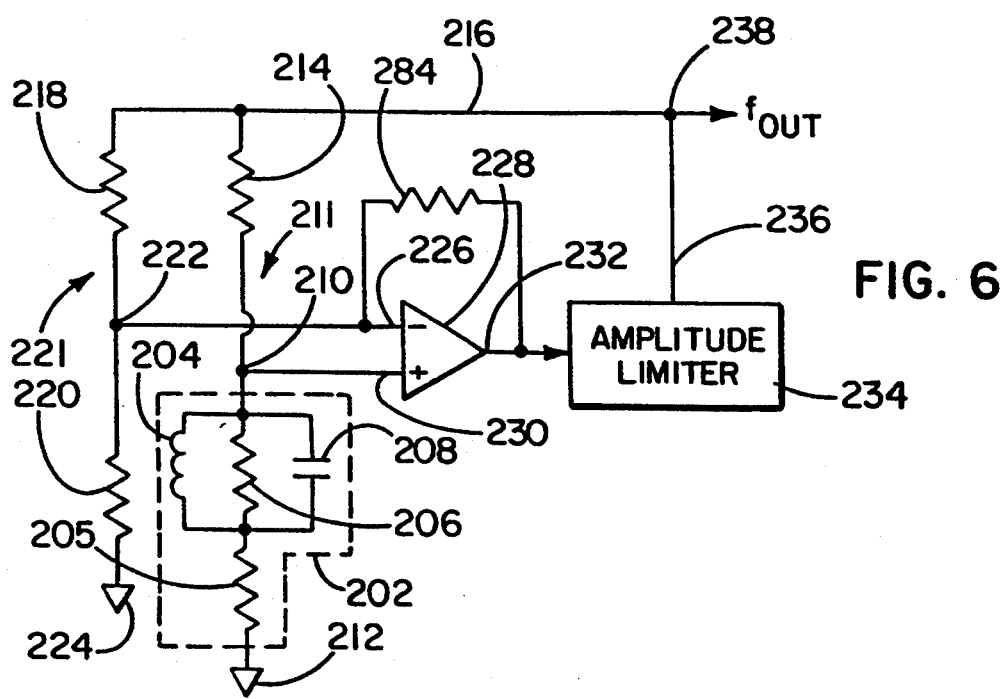

VIBRATING BEAM FORCE TRANSDUCER WITH AUTOMATIC DRIVE CONTROL

CROSSREFERENCE TO RELATED APPLICATION

The present application is related to U.S. patent application Ser. No. 08/072,093 entitled "VIBRATING FORCE TRANSDUCER WITH AUTOMATIC ADJUSTMENT OF ITS ELECTROMAGNETIC DRIVE" filed concurrently herewith by James R. Woodruff and Michael J. Robinson and assigned to the same assignee as the assignee of the present application.

1. Field of the Invention

This invention relates generally to force transducers, and more particularly to an improved electromagnetic drive circuit for a force transducer that provides automatic compensation through the use of direct current (DC) voltage in order to stabilize the resonator electrical Q.

2. Background of the Invention

Vibrating beam force transducers are often used as force-to-frequency converters in accelerometers, pressure sensors and related instruments. In one wellknown design, described in U.S. Pat. No. 4,372,173, the force transducer is in the form of a double-ended tuning fork fabricated from crystalline quartz. The transducer comprises a pair of side-by-side beams that are connected to common mounting structures at their ends. Electrodes are deposited on the beams in predetermined patterns, and the electrodes are connected to a drive circuit. The drive circuit provides a periodic voltage that causes the beams to vibrate toward and away from one another, 180° out of phase. In effect, the drive circuit and beams form an oscillator, with the beams playing the role of the frequency control crystal, i.e., a mechanical resonance of the beams controls the oscillation frequency. A tension force applied along the beams increases the resonant oscillation frequency. The frequency of the drive signal is thereby a measure of the force applied axially along the beams.

Vibrating beam force transducers require materials with low internal damping, to achieve high Q values that result in low drive power, low self-heating, and insensitivity to electronic component variations. Transducer materials for high-accuracy instruments also require extreme mechanical stability over extended cycles at high stress levels. One of the key problems in producing such transducers involves the drive and position pick-off measurement. Crystalline quartz is the most commonly used material for mechanical transducers because of its piezoelectric properties, which properties provide the ability to drive and sense mechanical motion through the use of a simple surface electrode pattern.

With the advent of low cost, micromachined mechanical structures fabricated from crystalline silicon, it has become desirable to create silicon vibrating beam transducers. However, silicon does not possess piezoelectric properties for driving and sensing beam vibration. It was therefore desirable to provide a method of exciting and sensing the resonance of a silicon beam, without adding substantial costs, mechanical instabilities, or excessive complexity. One prior approach to this problem was described in U.S. Pat. No. 4,912,990, issued to the assignee of the present invention. The invention described in the '990 patent provides a vibrating beam force transducer that can be realized in a silicon micromachined structure. The force transducer is of the type comprising a beam having a longitudinal axis, and drive circuitry electrically coupled to the beam for causing the beam to oscillate at a resonant frequency that is a function of a force applied along the longitudinal axis of the beam. Magnetic means are provided for creating a magnetic field that intersects said axial component. Motion of the beams in the magnetic field generates a signal voltage. This voltage is amplified, and the amplified voltage drives current along a conduction means physically coupled to the beam. The electric current flowing along the current path thereby interacts with the magnetic field, so as to produce a force on the beam that causes the beam to oscillate at the resonant frequency.

One difficulty which has arisen with respect to the drive means utilized in the prior art concerns variations caused by temperature cycling of the transducer and its drive circuitry.

In a particular drive circuit utilized in conjunction with a doubled-ended tuning fork (DETF) in a force transducer of the type described in the '990 patent, the tuning fork is covered by oxide and a conducting layer of gold is applied over the oxide to provide an electrically conducing path. This conducting path traverses from a first end of one tine to the other end of the tuning fork, across the adjacent end of the other tine, and back along the second tine to the end of the second tine adjacent to the first end of the first tine. There is a voltage difference between electrical connections to the ends of this conducting path which comprises two components: a first component generated by the motion of the tines in the magnetic field; and a second component caused by the flow of the drive current through the electrical resistance of the conducting path and any leads between the connections and the tines. A bridge is formed of two voltage dividers, one of which includes the conducting path along the tines and any leads, permits a differential amplifier to subtract out the second voltage component. The resistance of the bridge components can change with temperature. The problem arises most particularly with respect to the resistor in series with the double-ended tuning fork. The gold conducting path on the tuning fork, and any gold leads from the resistor in series with this path, change resistance with temperature, so that the voltages from the two voltage dividers are not the same, in which case the effective electrical Q of the resonator is significantly degraded, and the oscillator works poorly or does not work at all. One method which can be utilized to compensate for this is by forming the appropriate resistor of the parallel divider by depositing gold on an insulating outside layer of the silicon at the same time the gold conducting path on the tuning fork is deposited. It can be difficult or impractical to apply the gold so that its change in resistance matches that of the gold on the tuning fork. Also, this may then necessitate trimming of the resistor, which is an undesirable requirement in production.

It therefore is desirable to provide an electric drive circuit for the magnetically driven force transducer which compensates for any differences in resistance which may occur as a result of temperatures cycling over the operating range of the device.

SUMMARY OF THE INVENTION

The present invention overcomes the shortcomings of the prior art in providing a force transducer which is comprised of an oscillating sensing element having a frequency output indicative of the force applied to the sensing element. The sensing element has a variable electrical resistance which varies in accordance with temperature fluctuations over the operating range of the transducer. The present inventions compensates for this change in resistance, which would otherwise degrade performance.

A drive circuit utilizes an AC drive signal source that is electrically coupled to the sensing element to drive the sensing element at its resonant frequency which is a function of the force applied to the sensing element. The drive circuit includes a DC compensation circuit, which is utilized for altering the drive circuit in response to variations in the electrical resistance of the sensing element.

BRIEF DESCRIPTION OF THE DRAWINGS

Reference is now made to the description of the preferred embodiments, illustrated in the accompanying drawings, in which:

FIG. 1 is a schematic view illustrating the force transducer of the present invention;

FIG. 2 is a preferred embodiment of a transducer body;

FIG. 3 is a top plan view schematically illustrating a preferred resonant mode for the transducer of FIG. 2;

FIG. 4 is a schematic view illustrating the use of a force transducer in a micromachined accelerometer;

FIG. 5 is a perspective view of a further preferred embodiment of the transducer body;

FIG. 6 is an electrical schematic illustrating a drive circuit which has been utilized with the force transducer of FIGS. 1 and 5.

DETAILED DESCRIPTION OF THE INVENTION

Figure 7:
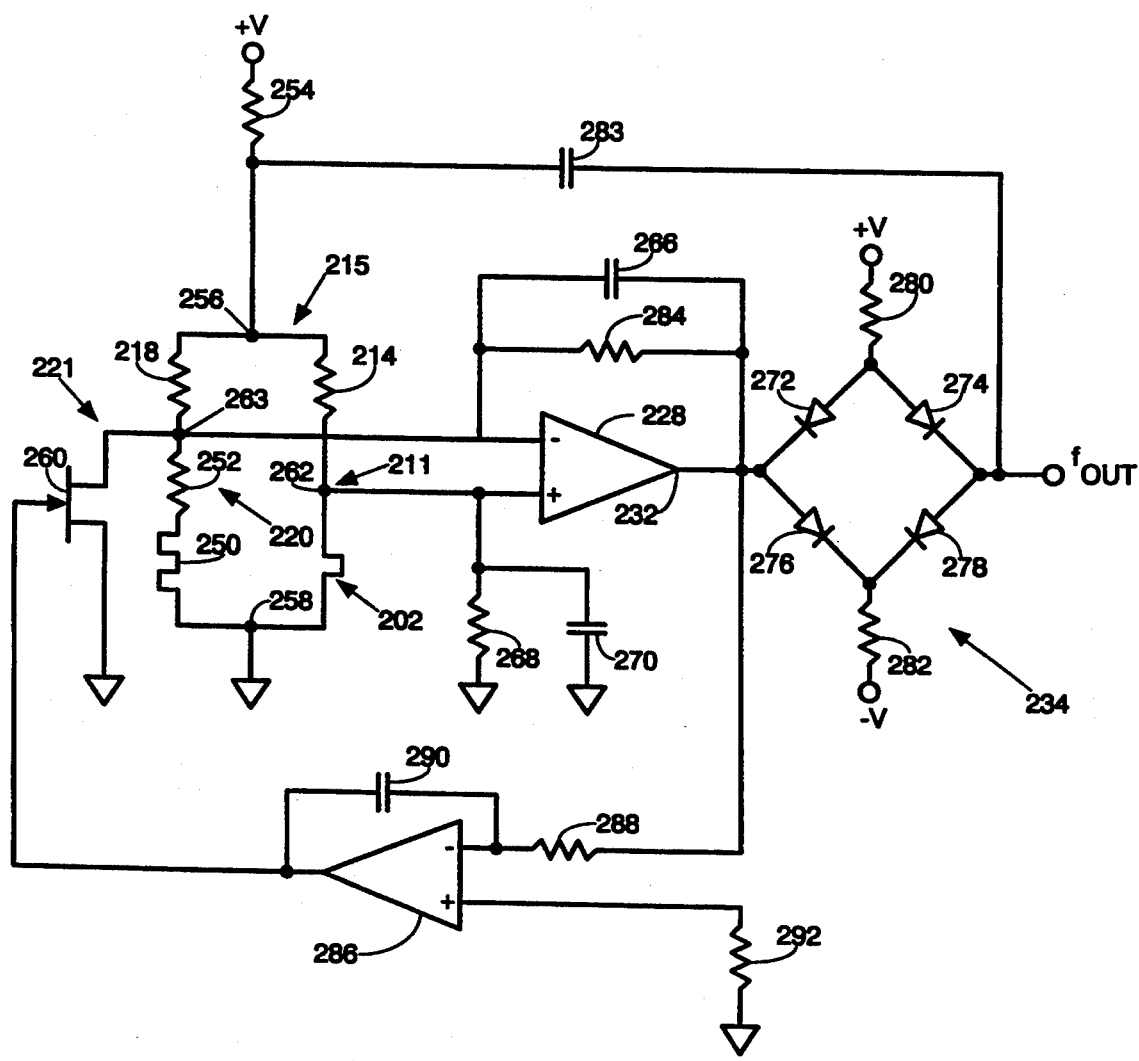
FIG. 7 is a simplified electrical schematic diagram illustrating the drive circuitry utilized in this invention.

FIG. 1 schematically illustrates a force transducer according to the present invention. The transducer comprises a beam 10, magnets 20 and 22, and the drive circuit 24. The beam 10 is connected between structures 12 and 14 along longitudinal axis 16 thereof, and includes an electrically conductive region 18 that extends generally parallel to the axis 16. Structures 12 and 14 exert a tension or compression force F on the beam 10. The magnets 20 and 22 produce a magnetic field B that passes through the beam 10, and in particular through the conductive region 18, in a direction generally normal to the axis 16.

The drive circuit 24 is connected to the conductive region 18 by lines 30 and 32, and causes a periodic current to flow through the conductive region. Flow of current along region 18 interacts with the magnetic field B, to produce a periodic force on the beam 10. In the arrangement shown in FIG. 1, this force is directed into and out of the plane of the drawing, thereby causing the beam 10 to oscillate along such direction. The drive circuit 24, in combination with the beam 10, forms an electrical oscillator that oscillates at a frequency determined by the mechanical resonance of the beam. The frequency of such resonance in turn depends upon the axial force F exerted on the beam by structures 12 and 14. The drive circuit 24 thereby produces an output signal on line 40 at a frequency f that is a function of the axial force F. The frequency measurement circuit 42 measures the frequency of this signal, which typically will be on the order of one hundred kilohertz (100 KHz), to produce an output signal on line 44 that provides a measure of force F.

In the arrangement shown in FIG. 1, the drive circuit 24 provides two functions. First, the drive circuit 24 provides the electrical energy that causes current to travel along path 18. Second, the drive circuit frequency locks to the mechanical resonance of the beam 10, so that the drive circuit 24 also provides a pick off means for determining the oscillation frequency.

A preferred embodiment of the transducer of the present invention is shown in FIG. 2. The illustrated transducer includes a body 50 having the overall form of a double-ended tuning fork (DETF), the body 50 including parallel beams 52 and 54 interconnected at their ends by the mounting pads 56 and 58. A conductive (e.g., metallic) trace 60 is deposited on the upper surface of the body 50, and extends from a first contact 62 on the mounting pad 56, along the beam 52 to the mounting pad 58, and then back along the beam 54 to a second contact 64 also on the mounting pad 56. Contacts 62 and 64 are in turn connected to the drive circuit 24. If the beam is of an electrically conducting material such as silicon crystal, a layer of insulating material is provided before deposition of the conductive trace. For example, oxide may be grown as silicon.

A magnetic field B is generated in a direction perpendicular to the beams 52 and 54 and to the plane in which the body 50 is formed. As a result, a current I passing through the trace 60 from the contact 62 to the contact 64, in the direction indicated by the arrows in FIG. 2 produces outwardly directed forces on the two beams. When the current flow direction is reversed, inwardly directed forces are produced. As a result, the beams can be made to oscillate in the triplanar symmetric mode shown in FIG. 3.

In this mode, the beams vibrate towards and away from one another, 180° out of phase. This mode of oscillation is preferred, because it tends to cause cancellation of the stresses coupled into mounting pads 56 and 58, thereby minimizing the amount of mechanical energy transmitted through the mounting pads into the structures to which the mounting pads are attached.

FIG. 4 schematically illustrates the use of a transducer of the type shown in FIG. 2 in an accelerometer. The accelerometer includes a proof mass 70 connected to a support 72 by the flexure 74, and a transducer body 50 extending between the proof mass 70 and support 72 in a direction generally parallel to the flexure 74. A pair of magnets 80 and 82 produce a magnetic field normal to the axis of the body 50, and the body is connected to a drive circuit 84 that provides periodic current flow through the transducer beams. In this application, the transducer shown in FIG. 2 has the advantage that both of the electrical contacts of the transducer are positioned on the same mounting pad, so that an electrical connection to the proof mass 70 is unnecessary.

An accelerometer of the type shown in FIG. 4 can be fabricated by means of known silicon micromachining techniques. For example, one could commence with a wafer of P-type silicon having N-doped epitaxial layers on both surfaces. The epitaxial layer on the upper surface could be etched to form transducer body 50, while the epitaxial layer on the lower surface could be etched to form flexure 74, in both cases using an electrochemical etch stop. Alternatively, transducer body 50 could lie in the plane of the upper surfaces of proof mass 70 and support 72, with the transducer body again being formed from an N-doped epitaxial layer.

The transducers described above all include conductive regions or traces within the transducer beam or beams. FIG. 5 illustrates an embodiment in which the entire beams conduct the current provided by the drive circuit. This embodiment includes body 90 comprising beams 92 and 94 that are connected to common mounting pad 96 at one end, and that form a pair of separating mounting pads 100 and 102 at their opposite ends. Body 90 is constructed from a conductive material, such as conductive silicon, silicon epitaxy, etc. Structures 110 and 112 comprise a nonconductive material, such as nonconductive bulk silicon. Mounting pads 100 and 102 are connected to structure 110, which could for example comprise a support in an accelerometer, and mounting pad 96 is connected to structure 112, which could for example comprise a proof mass in an accelerometer. Mounting pads 100 and 102 comprise the electrical contacts for connection to the drive circuit.

A nonconductive filler 106 is positioned between a portion of mounting pads 100 and 102, to provide mechanical beam-to-beam coupling without permitting electrical current to flow therebetween. Filler 106 could comprise an oppositely doped material that formed a diode junction with transducer body 90. Optionally, a second nonconductive filler 114 may be positioned between beams 92 and 94 at mounting pad 96, to provide mechanical symmetry. The additional mechanical coupling between the beams that is provided by the fillers helps ensure that both beams resonate at the same frequency. The symmetry provided by filler 114 is important for dynamic balance to minimize energy loss to the surrounding structure. Fillers 106 and 114 overlie respective structures 110 and 112 to a degree sufficient to make both ends appear elastic or identical with respect to beam coupling, despite their functional dissimilarity.

Referring now more particularly to FIG. 6, therein is illustrated a drive circuit which can be utilized for driving the double-ended tuning fork (DETF) illustrated in FIGS. 2 and 5. The DETF 202 can be electrically schematically illustrated as the parallel combination of the inductor 204, the resistor 206, and the capacitor 208, and the resistor 205 in series therewith. The resistor 205 is variable; that is, the DC resistance of the DETF can vary as the DETF cycles over its operating temperature range. The DETF 202 is connected in the circuitry between node 210 and ground 212. A resistor 214 is connected in series with the DETF 202, and is connected between node 210 and line 216, with the DETF 202 and the resistor 214 forming a voltage divider 211.

Connected in parallel with the voltage divider 211 so as to form a bridge 215 are serially connected resistors 218, 220, with node 222 being disposed therebetween to form the voltage divider 221. Resistor 220 is further connected to ground 224.

The node 222 between resistors 218, 220 is connected to the negative input terminal 226 of the differential amplifier 228. The positive input 230 of the differential amplifier 228 is connected to node 210. A resistor 284 is connected between the negative input terminal 226 and the output terminal 232 of the first differential amplifier 228. The output 232 of differential amplifier 228 is connected to an amplitude limiter 234 which limits the magnitude of the voltage that is being exited by the differential amplifier 228. The output 236 of the amplitude limiter 234 is connected to line 216 at node 238.

The node 238 is also utilized as the connection point for the frequency measurement circuit 42 (FIG. 1) which generates an output signal that provides a measure of the force F being exerted on the DETF 202.

The resistance of resistor 214 is high when compared to that of the DETF 202. The resistor 214 converts the voltage from the amplitude limiter 234 to the current required to drive the DETF at a desired amplitude. At the node 210 there is present a voltage with two components; a first component equal to the product of the DETF drive current and the resistance of the element 202, and a second component generated by the DETF 202 vibrating in the magnetic field. The resistors 218, 220 are chosen so that the output of the divider 221 at node 222 is equal to the first component of the divider 211 at its output node 210. The two dividers 211, 221 form a bridge 215, as mentioned previously and, if properly balanced, the output of this bridge 215 is the voltage generated by the DETF 202 vibrating in the magnetic field. The bridge output is sensed by the differential amplifier 228 so that the voltage amplified and applied to the voltage limiter 234 is that generated by the DETF 202.

The problem with the circuitry illustrated in FIG. 6 that has been previously mentioned is that the gold conducting path on the DETF 202 and the gold leads from the resistor 220 change resistance with temperature, so that the voltages from the two dividers may not be the same and the oscillator works poorly or does not work at all.

To overcome the deficiencies of the drive circuit illustrated in FIG. 6, the drive circuit schematically illustrated in FIG. 7 was developed. In FIG. 7, like elements will retain their same reference numerals as were present in FIG. 6, and items that have been added will bear reference numerals beginning with the reference numeral 250.

In the embodiment illustrated in FIG. 7, the leg 220 of the bridge 215 comprises a thermal compensating resistor 250 connected in series with a fixed or a negative temperature coefficient of resistance resistor 252. The values of the resistors 250 and 252 and the thermal coefficient of resistance of the resistor 250 are selected to match the resistance and thermal coefficient of resistance of the vibrating tine assembly shown schematically in FIG. 7 and designated by the reference numeral 202. A resistor 254 connects a top node or input node 256 of the bridge 215 to a source of positive DC potential. A bottom node or input node 258 connects the bridge 215 to ground potential, but the node 258 may be connected to other potentials, either positive or negative, or the roles of the nodes 256 and 258 may be reversed depending on the application and available circuitry.

A variable resistance element in the form of a field effect transistor 260 and is connected between an output node 262 of the bridge and ground. Various field effect transistors may be used as the field effect transistor. Transistor 260 is shown to be an N-channel field effect transistor, but it will be appreciated by those skilled in the art that a P-channel field effect transistor or other suitable voltage variable resistance device could be used. The output node 262 is connected to one input of the differential amplifier 228 whose other input is connected to a second output node 263.

A resistor 284 and a capacitor 266 are connected in parallel in a negative feedback loop around the amplifier 288. A resistor 268 and a capacitor 270 are connected in parallel between the positive input of the amplifier 228 and ground. The functions of these resistors and capacitors will be explained in a subsequent section of the specification.

The amplitude limiter 234 which was shown as a block in FIG. 6 it is illustrated as a four-diode bridge comprising diodes 272, 274, 276 and 278 that are maintained forward biased by a resistor 280 connected to a source of positive potential and by a resistor 282 connected to a source of negative potential. While the limiter 234 is illustrated as a four-diode limiter in FIG. 7, it should be understood that any suitable limiter could be used. The output of the amplitude limiter 234 is coupled to the input node 256 of the bridge 215 by means of a capacitor 283 which serves as part of an AC feedback loop between the output of the amplitude limiter 238 and the input node 256 of the bridge.

A differential amplifier has its negative input connected to the output of the amplifier 228 via a resistor 288. The output of the amplifier 286 is connected to the gate of the field effect transistor for the purpose of controlling the resistance of the field effect transistor 260. An integrating capacitor 290 is connected in a feedback loop across the amplifier 286 and a resistor 292 provides a resistor to ground.

The operation of the drive circuitry is as follows. The force F exerted on the tines of the DETF causes them to resonate, causing a voltage to be generated and amplified by the differential amplifier 228. The DETF voltage is then limited by the limiter 234 and is fed back to the voltage dividers 211 and 221 in FIG. 6 via a direct current conducting path. Because the output of the limiter 234 contains both AC and DC components, an excessive DC component would degrade or prevent the operation of the system, and in the system of FIG. 6, the effects of any DC voltages are minimized by an attempt to balance the bridge accurately as described heretofore in the application, but such a balancing process is difficult and expensive.

In accordance with an important aspect of the invention, the applicant realized that by separating the AC components from the output of the limiter to provide AC excitation for the tines, and by separating the DC component from the output of the amplifier 228 to provide a bridge balancing function, the bridge could be more accurately balanced than previously contemplated and at lower cost. In the circuit of FIG. 7, the output of the bridge 234 is applied to the input node 256 of the bridge 215 via the capacitor 283. Because DC currents cannot flow through a capacitor, only the AC components of the output of the limiter 234 reach the input node 256. The AC components then are applied to the DETF 202 via the resistor 214, and if the bridge 215 is properly balanced, the oscillatory signal from the tines 202 is amplified by the amplifier 228 limited by the limiter 234 and fed back again to the bridge 215 to continue oscillation. However, if the bridge is unbalanced, then reduced or no oscillation will occur. The problem of bridge balance is addressed by monitoring the direct current voltage at the output of the amplifier 228 or at another suitable portion of the circuit and utilizing the direct current portion of the signal whose magnitude is an indication of the degree of bridge imbalance in a feedback loop to control a variable resistance to rebalance the bridge. This function is accomplished by the differential amplifier 286 and associated components and the field effect transistor 260.

The output of the amplifier 228 contains both AC and DC components that are applied to the amplifier 286 via the resistor 288. The amplifier 286, the resistor 288 and the capacitor 290 cooperate to form an integrating amplifier that passes DC components and removes substantially all AC components above a frequency determined by the values of the resistor 288 and the capacitor 290. The DC voltage is then utilized to control the resistance of the field effect transistor 260. Because the feedback capacitor 284 and the field effect transistor 260 introduced phase shifts into the system, phase compensation is desirable to maintain the overall loop phase shift at zero degrees. Thus, the feedback resistor 284 and feedback capacitor 266 are utilized to compensate for the phase shift introduced by the capacitor 283 in a known fashion, as are the resistor 268 and capacitor 270 utilized to compensate for the phase shift introduced by the field effect transistor 260.

The resistance of the sensing member 202 is provided by the gold conductor utilized to energize the device. A thin gold film has a temperature compensation of approximately 4000 parts per million per degree C., which would amount to an 80% change in its resistance over the operating range of the device. If the resistor 220 were a standard resistor, the amount of correction from the FET 260 could be beyond the resistance range of the FET 260. Thus, the resistor 220 should have a thermal resistance characteristic similar to that of the resistance of the sensing member 202, and it is possible to use a gold resistor as the resistor 220. However, the field effect transistor has a near zero thermal coefficient of resistance that would tend to introduce a mismatch between the tracking of the resistor 202 and the leg including the resistor 220. Thus, if desired, a resistor 252 having a comparable near zero temperature coefficient to that of the transistor 260 or even a standard resistor may be utilized to reduce the net temperature coefficient effects of the FET 260.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A force transducer comprising:
    an oscillating sensing element having an output frequency indicative of the force applied to the sensing element, said sensing element having a variable electrical resistance;
    means electrically coupled to said sensing element for electrically driving said sensing element to cause said sensing element to oscillate at a resonant frequency that is a function of the force applied to said sensing element, said driving means having means for amplifying electrical signals, said amplifying means having means for receiving input signals and means for providing output signals, said input signal receiving means being electrically coupled to said sensing element;
    said electrical driving means having means for DC compensating said driving means for variations in the electrical resistance of the sensing means, said DC compensating means being electrically coupled between said input signal receiving means and said output signal providing means; and said driving means having means separate from said DC compensating means for applying an AC drive signal to said sensing element to thereby cause said sensing element to oscillate, said AC drive signal applying means being electrically coupled between said output signal providing means and said sensing element, said AC drive signal applying means including a capacitor for preventing the flow of DC signals between said output signal providing means and said sensing means.

2. The force transducer recited in claim 1, wherein said DC compensating means further includes a variable resistance element, said DC compensating means being operative to vary the resistance value of said variable resistance element in response to variations in the electrical resistance of said sensing element.

3. The force transducer recited in claim 2, wherein said variable resistance element includes a field effect transistor.

4. A force transducer comprising:
an oscillating sensing element having an output frequency indicative of the force applied to the sensing element, said sensing element having a variable electrical resistance;
means electrically coupled to said sensing element for electrically driving said sensing element to cause said sensing element to oscillate at a resonant frequency that is a function of the force supplied to said sensing element, said driving means having means for amplifying electrical signals, said amplifying means having means for receiving input signals and means for providing output signals, said input signal receiving means being electrically coupled to said sensing element;
said electrical driving means having means for DC compensating said driving means for variations in the electrical resistance of the sensing means, said DC compensating means being electrically coupled between said input signal receiving means and said output signal providing means; and
said driving means having separate from said DC compensating means for applying an AC drive signal to said sensing element to thereby cause said sensing element to oscillate, said AC drive signal applying means being electrically coupled between said output signal providing means and said sensing element, said AC drive signal applying means including means for preventing the flow of DC signals between said output signal providing means and said sensing means;
wherein said DC compensating means further includes a variable resistance element, said DC compensating means being operative to vary the resistance value of said variable resistance element in response to variations in the electrical resistance of said element;
wherein said variable resistance element includes a field effect transistor; and
wherein said field effect transistor forms a part of a bridge circuit.

5. The force transducer recited in claim 4, wherein said AC drive signal applying means is connected to said bridge circuit.

6. The force transducer recited in claim 4, wherein the variable electrical resistance of said sensing element has a predetermined thermal coefficient of resistance, and wherein said field effect transistor is connected in parallel with a series combination of a first resistor having a thermal coefficient of resistance similar to that of the sensing element and a second resistor, the values of the resistances of said first and second resistors and the thermal coefficient of resistance of said second resistor being selected to optimize the operating characteristics of the field effect transistors.

7. The force transducer recited in claim 6, wherein said first resistor has a positive thermal coefficient of resistance and said second resistor is a fixed resistor.

8. The force transducer recited in claim 6, wherein said first resistor has a positive thermal coefficient of resistance and said second resistor has a negative coefficient of resistance.

9. The force transducer recited in claim 5, wherein said sensing element is a double-ended tuning fork.

10. A force transducer comprising:
an oscillating sensing element having a frequency output indicative of the force applied to the sensing element, said sensing element having a variable electrical resistance; and
drive means electrically coupled to the sensing element for causing the sensing element to oscillate at a resonant frequency that is a function of the force applied to the sensing element, said drive means comprising:
a first voltage divider comprised of a resistance element electrically serially connected to said sensing element and having a first output node therebetween;
a second voltage divider, comprised of at least two resistance elements electrically serially connected to each other with a second output node therebetween, said first and second voltage dividers being connected electrically in parallel at first and second input nodes;
comparator means having inputs coupled to said first and second output nodes for determining the difference in output between said first and second output nodes and an output;
compensating means coupled to said output and to said second voltage divider for altering the resistance of said second voltage divider in response to variations in the resistance of said sensing element; and
AC drive signal applying means coupled to said output and to one of said input nodes for applying AC drive signals to said sensing element from said output while preventing the flow of DC signals between said output and said one of said input nodes.

11. The force transducer according to claim 10, wherein said comparator means comprises a differential amplifier whose output includes a DC signal representative of the difference in DC voltage between said first and second output nodes and an AC signal representative of the vibrating frequency of the sensing element, said differential amplifier output DC signal being applied to one of the resistance elements of said second voltage divider, and the AC signal being applied to one of said input nodes.

12. The force transducer according to claim 11, wherein said compensating means includes a field-effect transistor connected in parallel with one of said second voltage divider resistance elements, said field-effect transistor having the DC signal applied thereto.

13. A force transducer comprising:
an oscillating sensing element having an output frequency indicative of the force applied to the sensing element, said sensing element having a variable electrical resistance;

means including an amplifier electrically coupled to said sensing element for driving said sensing element to resonate at a frequency indicative of the amount of force applied to said sensing element, said driving means including means including a variable resistance element for biasing said amplifier, wherein said sensing element forms part of said biasing means, an AC feedback loop electrically coupled to an output of said amplifier and to said sensing element, said AC feedback loop being operative to prevent DC signals from being transferred therethrough, and a DC feedback loop electrically coupled to an output of said amplifier and to said variable resistance element;

said DC feedback loop being operative to adjust the resistance of said variable resistance element in response to changes in the electrical resistance of said sensing element to thereby maintain said amplifier biased in a predetermined bias range.

14. A force transducer as recited in claim 13, wherein said biasing means includes a bridge circuit and wherein said sensing means forms at least a part of one of said legs and said variable resistance element forms at least a part of another one of said legs.

15. A force transducer as recited in claim 14, wherein said variable resistance element includes a field effect transistor.

16. A force transducer as recited in claim 15, wherein said force transducer includes a double-ended tuning fork.

* * * * *